Oct. 14, 1941.   J. D. NEAL   2,259,173
AUTOMOBILE SUNSHADE
Filed Oct. 7, 1940
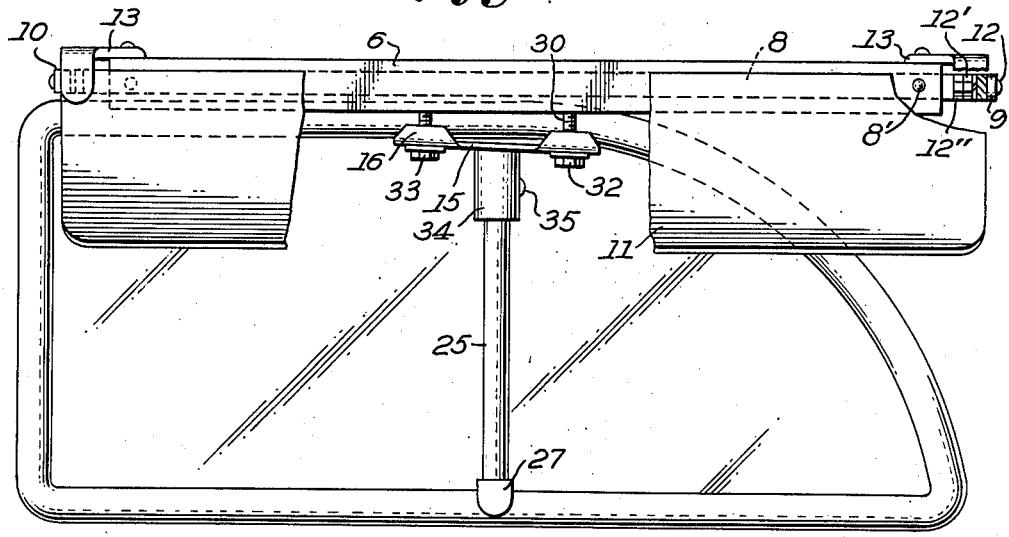
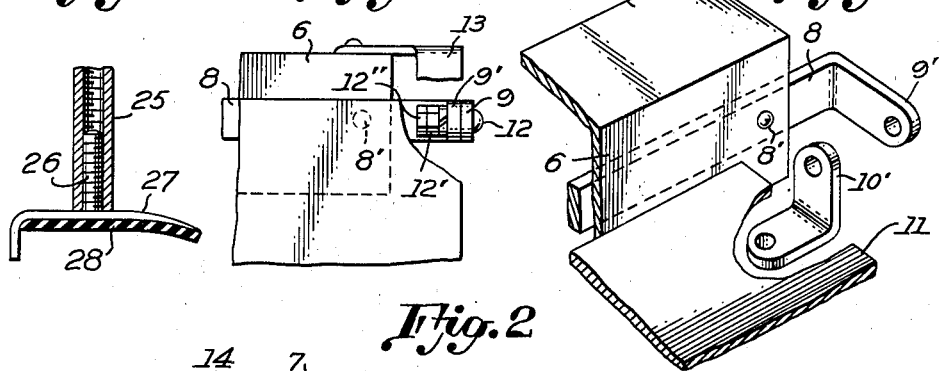
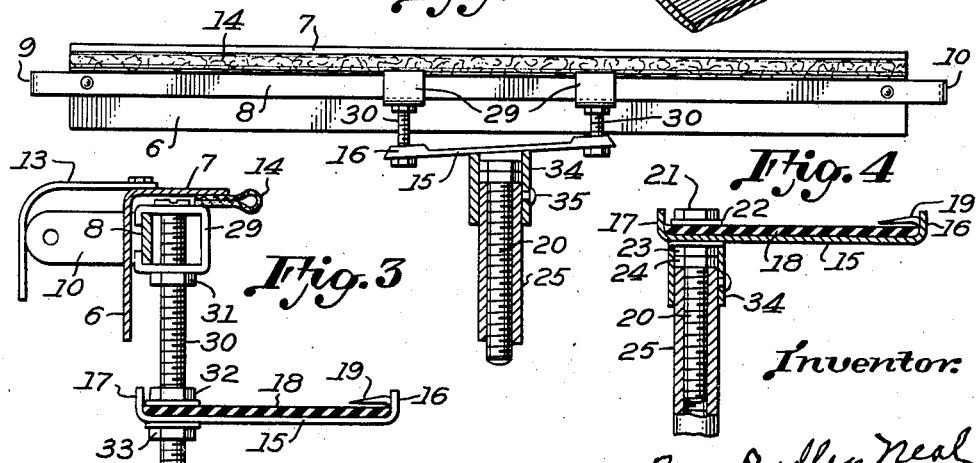
Inventor:
Jay Dudley Neal Patented Oct. 14, 1941

2,259,173

UNITED STATES PATENT OFFICE 2,259,173

AUTOMOBILE SUNSHADE

Jay Dudley Neal, Oklahoma City, Okla.

Application October 7, 1940, Serial No. 360,013

2 Claims. (Cl. 296—95)

This invention relates to a sun-shade for an automobile-window, and the object of the invention is to hold the shade and its parts to the window of an automobile by a single support, so that there will be as little interference with vision as possible.

Figure 1 on the sheet of drawings, is an elevational view, partly in section, and showing the shade applied, and the intermediately disposed support for the shade;

Figure 1—A is a detail view of one end of the shade, the shade-bar, and the bolt and nuts holding the ears of each in place; the nut retainer for the nuts being omitted;

Figure 1—B is a fragmented disassociated view in perspective, showing the shade bar, and one of its ears; the metal shield, and the shade ear and shade dismantled from both—the nut retainer and bolt and nuts being omitted;

Figure 2 is a rear view, (sun-shade being omitted) showing the shade bar and bearings for supporting the same;

Figure 3 is a cross sectional view of Figure 2;

Figure 4 is a similar view showing the clip-plate and its stud entering the tubular support; the adjusting nut and the nut retainer, and Figure 5 is a side elevational view of a window clip at the bottom of the tubular support.

In these views, like characters of reference will indicate like parts.

A metal shield consisting of a piece bent upon itself to form two plates 6 and 7, has secured to it an elongated shade bar 8, which, at each end is bent into ears 9 and 10, to which the ears 9' and 10' of a sun-shade 11 are secured by bolts 12 which pass through the ears and are provided with nuts 12' and 12" which are retained against loosening by nut-retainers 13 which are secured to the metal shield. These retainers both hold the inner nut against the ears and the outer nut is held frictionally by the edge of the retainer co-acting with the face of the outer nut.

To the plate 7 is secured a fabric pad 14 which keeps the device from marring the finish on the car.

A clip plate 15 having clips 16 enters the glass groove, and has a stiffening edge 17 and a pad 18 which is held in place by an overturned portion 19. This plate is provided with the holes, the centrally located one receiving a downwardly projecting screw-threaded bolt 20 having a head 21 seated on a washer 22.

Upon this screw-threaded bolt two nuts 23 and 24 are applied, one holding the bolt in place to the clip plate 15 and the other movable upon the stud for purposes which will appear.

This stud bolt 20 is introduced into a tubular support 25, as does also a stud 26 rising from a clip 27 which is provided with a pad 28, this clip taking upon the upper edge of the lower part of the window frame.

By adjusting the nut 24 by lowering it on the bolt 20, the plate 15 rises to gripping position at the upper part of the frame, and thus holds the assembly in place. To keep the nut 24 from loosening, a keeper is provided, later to be explained.

The shade-bar 8 secured to the plate 6 by a rivet or bolt 8' passes through two bearings 29 and these bearings are supported by bolts 30 which rise from the plate 15.

To retain the nut 24 in place, pressing on the upper end of the tubular support, a keeper 34 is slipped upwardly, and a bolt 35 holds the keeper in place, this bolt passing through the keeper from the rear to the front to prevent tampering with it.

Having thus described this invention, I claim:

1. In an automobile sun-shade assembly, the combination with a movable sun-shade, of a shade-bar for supporting the same, bearings for said shade-bar, and in relation to which the bar may be longitudinally moved, a clip-plate for holding the bearings, a metal shield covering the shade-bar and bearings, and to which the shade bar is affixed, a pad secured to the shield, a tubular support for the clip-plate, a stud bolt depending from the clip plate and entering the tubular support, and adapted to adjustably position the clip-plate, means to hold the plate and support in adjusted positions and means to retain the adjusting means in position.

2. In an automobile sun-shade assembly, an elongated shade-bar terminating at each of its ends in an ear, a sun-shade, upstanding ears attached to said sun-shade, and which are adapted to be connected to the sun-shade-bar ears, bolts passing through the ears, and upon which the shade may move, means for holding the shade-bar to the window frame, and in relation to which the shade bar may longitudinally move, a stud depending from the shade-bar holding means, a single upstanding tubular support for receiving the stud and for supporting the shade bar in place, a clip entering the support for riding the upper edge of the lower part of the frame of an automobile window, a nut on the stud to be adjusted to force the plate into place, a retainer to hold said nut in place, a shield to cover the shade-bar and clip plate, and a fabric pad for the shield.

JAY DUDLEY NEAL.